US006493038B1

(12) United States Patent
Singh et al.

(10) Patent No.: US 6,493,038 B1
(45) Date of Patent: Dec. 10, 2002

(54) MULTI-WINDOW PIP TELEVISION WITH THE ABILITY TO WATCH TWO SOURCES OF VIDEO WHILE SCANNING AN ELECTRONIC PROGRAM GUIDE

(75) Inventors: Kenneth S. Singh, Harriman, NY (US); Richard C. Shen, Leonia, NJ (US); Sheau B. Ng, Briarcliff Manor, NY (US); Samuel O. Akiwumi-Assani, Beacon, NY (US); Alan P. Cavallerano, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 356 days.

(21) Appl. No.: 09/598,539

(22) Filed: Jun. 21, 2000

(51) Int. Cl.[7] ............................. H04N 5/45; H04N 5/445
(52) U.S. Cl. ......................... 348/565; 348/569; 725/41; 725/43
(58) Field of Search ................................. 348/563, 564, 348/565, 569, 584, 588, 586, 589, 598, 600, 567; 725/39, 40, 41, 43, 48, 49; H04N 5/45, 5/445, 5/50

(56) References Cited

U.S. PATENT DOCUMENTS 5,610,664 A  3/1997  Bobert ....................... 348/564

FOREIGN PATENT DOCUMENTS

| EP | 0737007 A | * 10/1996 |
| WO | 9734413 A1 | 9/1997 |
| WO | WO 9734414 A | * 9/1997 |
| WO | WO 9749242 A | * 12/1997 |
| WO | WO 9843418 A | * 10/1998 |
| WO | WO 9960784 A | * 11/1999 |
| WO | WO 0046988 A | * 8/2000 |

* cited by examiner

Primary Examiner—Sherrie Hsia
(74) Attorney, Agent, or Firm—Laurie E. Gathman

(57) ABSTRACT

The invention relates in general to a television receiver that is capable of displaying two video programs and an electronic program guide ("EPG") simultaneously. The EPG is displayed in a first portion of a split screen containing a picture-in-picture (PIP) display. Scanning of the electronic program guide causes different video programs to be displayed in the PIP display while the user is still able to watch the original video program on a second split screen.

10 Claims, 4 Drawing Sheets

MULTI-WINDOW PIP TELEVISION WITH THE ABILITY TO WATCH TWO SOURCES OF VIDEO WHILE SCANNING AN ELECTRONIC PROGRAM GUIDE

FIELD OF THE INVENTION

The invention relates in general to a television receiver that is capable of displaying two video programs and an electronic program guide ("EPG") simultaneously. The EPG is displayed in a first portion of a split screen containing a picture-in-picture (PIP) display. Scanning of the EPG causes different video programs to be displayed in the PIP display while the user is still able to watch the original video program on the second portion of the split screen.

BACKGROUND OF THE INVENTION

In a conventional picture-in-picture ("PIP") television receiver, the television takes video from at least two input sources and creates a single image. The image created by a PIP module is composed of a main part that occupies the full dimensions of the image, and one or more PIP parts that are scaled to occupy only a small portion of the overall image. The PIP part is typically wholly contained within the main part of the image.

The PIP part of the image may be arbitrarily positioned anywhere within the main picture, FIG. 1a. The PIP part of the image may also be arbitrarily sized (or resized), FIG. 1b.

In the multi-window display mode, also known in the television industry as picture-out-of-picture ("POP"), two or more non-overlapping display regions are arranged on the screen in a mosaic pattern. Each display region contains video from an independent video source, and can be of varying sizes or shapes. The preferred implementation of the multi-window feature limits the number of regions to two, equal-sized panels (panel 1 and panel 2) that are displayed side by side, FIG. 2. In effect the screen is comprised of two main regions.

Television systems are also available which include various types of on-screen program guides which provide a viewer with information about available programs. One of these systems is described in PCT WO 97/34413. The EPG is of the type which provides one or more screens of program listings. These listings may include currently telecast programs and programs to be broadcast in the future. The EPG includes a PIP window for display of a currently telecast program. The viewer may change the program displayed in the PIP window by cursoring through listings of currently telecast programs in the EPG.

The problem with these television systems is that you cannot watch one video program while scrolling through an interactive EPG selecting and viewing other video programs.

SUMMARY OF THE INVENTION

The present invention overcomes the above problem by having a split screen with an interactive PIP EPG whereby a user can watch a first video program on one half of the video screen, while using an EPG in the second half of the video screen and selecting programs from the EPG for scanning in the PIP. This provides a television which displays one video program while simultaneously permitting a viewer to search for something else to watch via the interactive EPG and PIP.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated by the claims.

BRIEF DESCRIPTION OF THE DRAWINGS

For a better understanding of the invention reference is made to the following drawings.

DESCRIPTION OF THE PREFERRED EMBODIMENTS

Figure 1A:
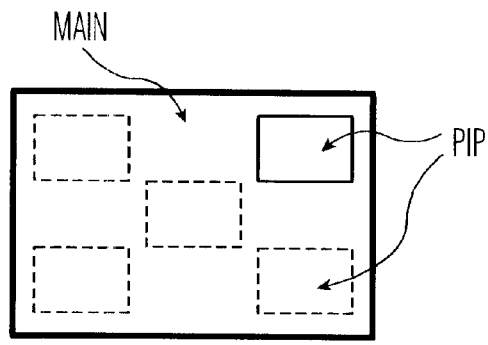
FIG. 1a shows a PIP display.
Figure 1B:
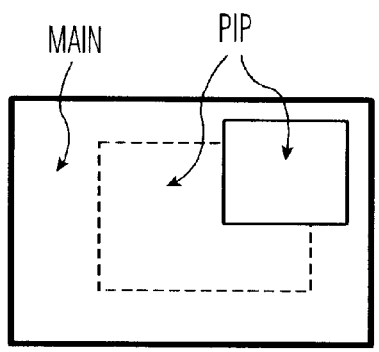
FIG. 1b shows another PIP display.
Figure 2:
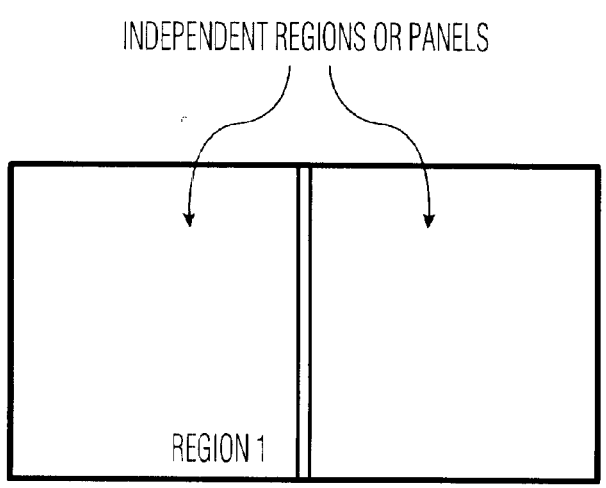
FIG. 2 shows a double window display.
Figure 3:
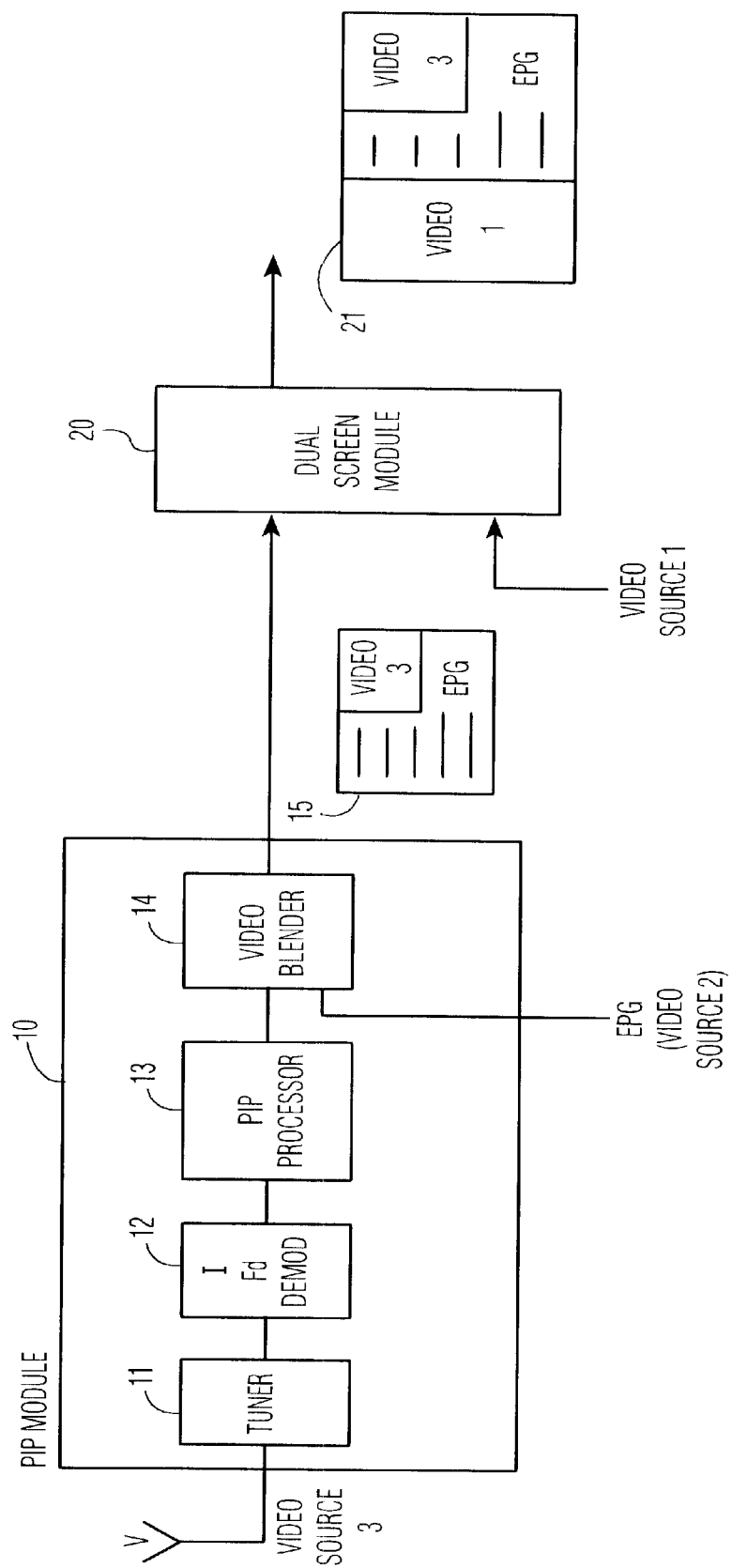
FIG. 3 shows a television system and the associated video outputs in accordance with the invention.

FIG. 3 is a general block diagram showing a television receiver in accordance with the instant invention. The PIP tuner 11 receives video from a video source such as an antenna, cable, or the NTSC/PAL modulated output of a VCR. The IF filter/Demodulator 12 conditions the signal from the tuner to separate out in-band audio and carriers from adjacent channels, then outputs what remains (luma, chroma, & syncs) as a composite video signal to the PIP Processor 13. The video sources to the PIP Processor 13 may include any content, including generated graphics and digital video. The PIP processor 13 output is a scaled down version of the video signal. This scaled down version is provided to a video blender 14 which takes at least two video sources and combines them in some programmable way. In this case the video blender 14 combines the PIP processor 13 output and the EPG signal. The output 15 of the video blender 14 is a main size display of the EPG with a PIP display of the video signal received via tuner 11. This combined signal is sent to the Dual Screen module 20 which receives also another video signal (video source 1) through a second tuner (not shown) or from another source. The term "tuner" herein refers to satellite, NTSC/PAL, ATSC or cable tuners, etc. The Dual Screen module 20 combines the second video source with the combined PIP EPG to create a three image display 21 where video content from video source 1 is shown in panel 1 which is the panel that does not contain the PIP sub-picture, and an EPG display (video source 2) is shown in panel 2 which is the panel that contains the PIP subpicture (video source 3). The PIP sub-picture in the second panel is used to display the video associated with the channels that are being browsed in the EPG.

Figure 4:
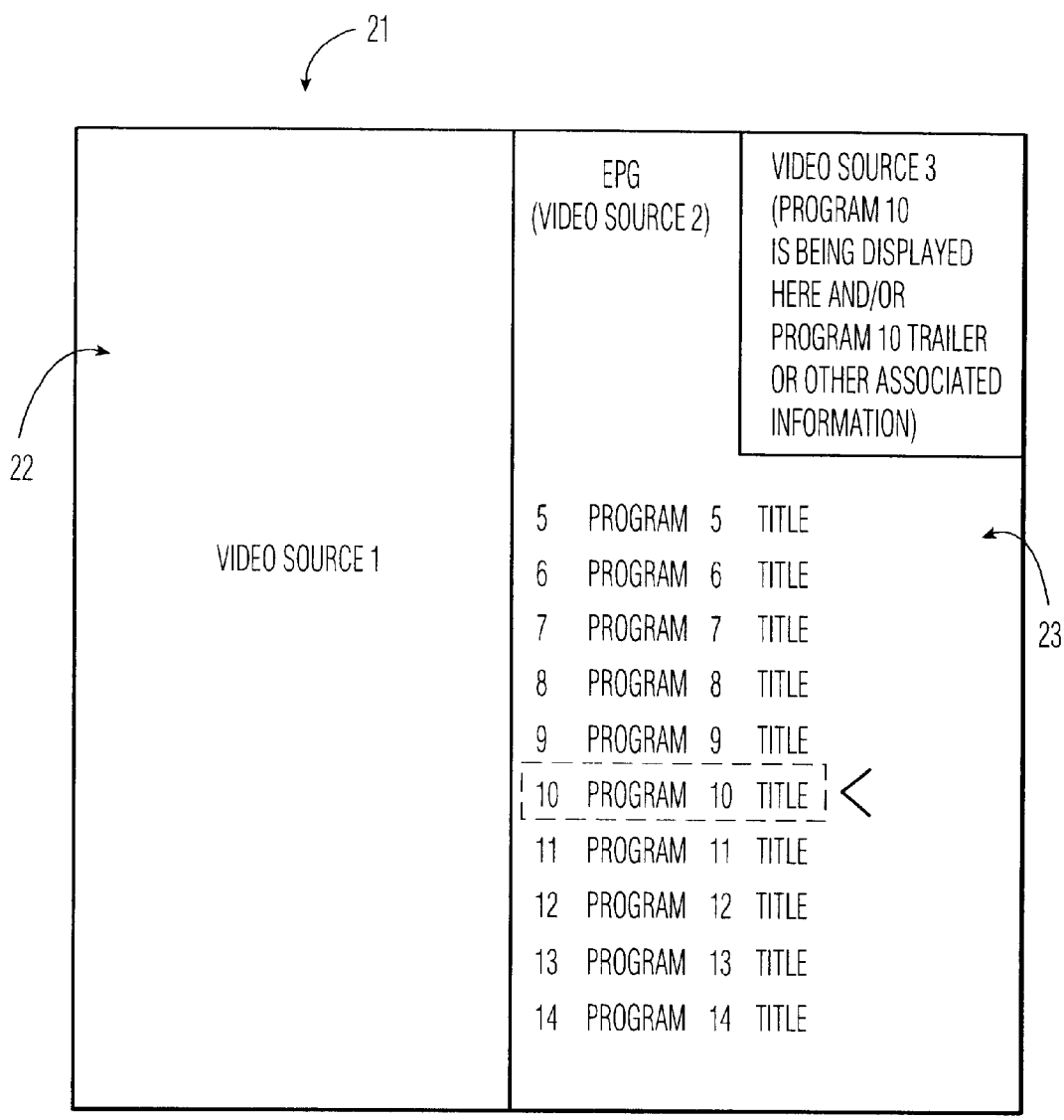
FIG. 4 shows a detailed display of a preferred embodiment of the invention.

In a preferred embodiment of the instant invention the first video source is from a DVD or VCR so that the user can watch a movie while browsing the EPG for a program on live TV. FIG. 4 is a more detailed view of the output 21 of the dual screen module 20 where the left hand of the screen 22 contains a first video program which is received from an outside video source (such as a VCR or DVD player) or from an on-board tuner. The right half of the screen 23 contains an interactive EPG with a PIP. The user scrolls through the EPG and when a program is selected it is viewed on the PIP to see if the user would like to watch this program instead of or in addition to the first video program. In the meantime the user has not missed anything in the first program because it is still being viewed on the left hand portion of the screen. Alternative, trailers or summaries can be displayed in the PIP when a program is selected from the EPG. In more expensive televisions there are two on-board tuners, one for the PIP video and one for the main video. In less expensive televisions the tuner from the VCR or another video source is used. The EPG is provided via many known methods such as in the-video stream itself or via a telephone connection, Tivo, etc.

The television may be provided with a remote control unit adapted to control the television and scan through an EPG. The television includes a remote control signal receiver for receiving control signals from the remote control. These signals are then decoded and provided to a controller for control of the television and EPG. The remote controller has all of the common features of a remote control such as channel up/down, volume up/down, power on/off, numeric keys and menu features. In addition, an EPG button and a scroll up/down button is provided for EPG navigation. Upon selection of the EPG button the television screen will become a multi-window screen as shown in FIG. 4. The user manipulates the scroll up/down button to navigate a selector through the EPG. As each program title on the EPG is highlighted or selected the video program corresponding to this program is automatically provided in the PIP. Alternatively the remote control may have a select button which if depressed during scrolling causes the video corresponding to the program title highlighted to appear in the PIP for that program.

Figure 5:
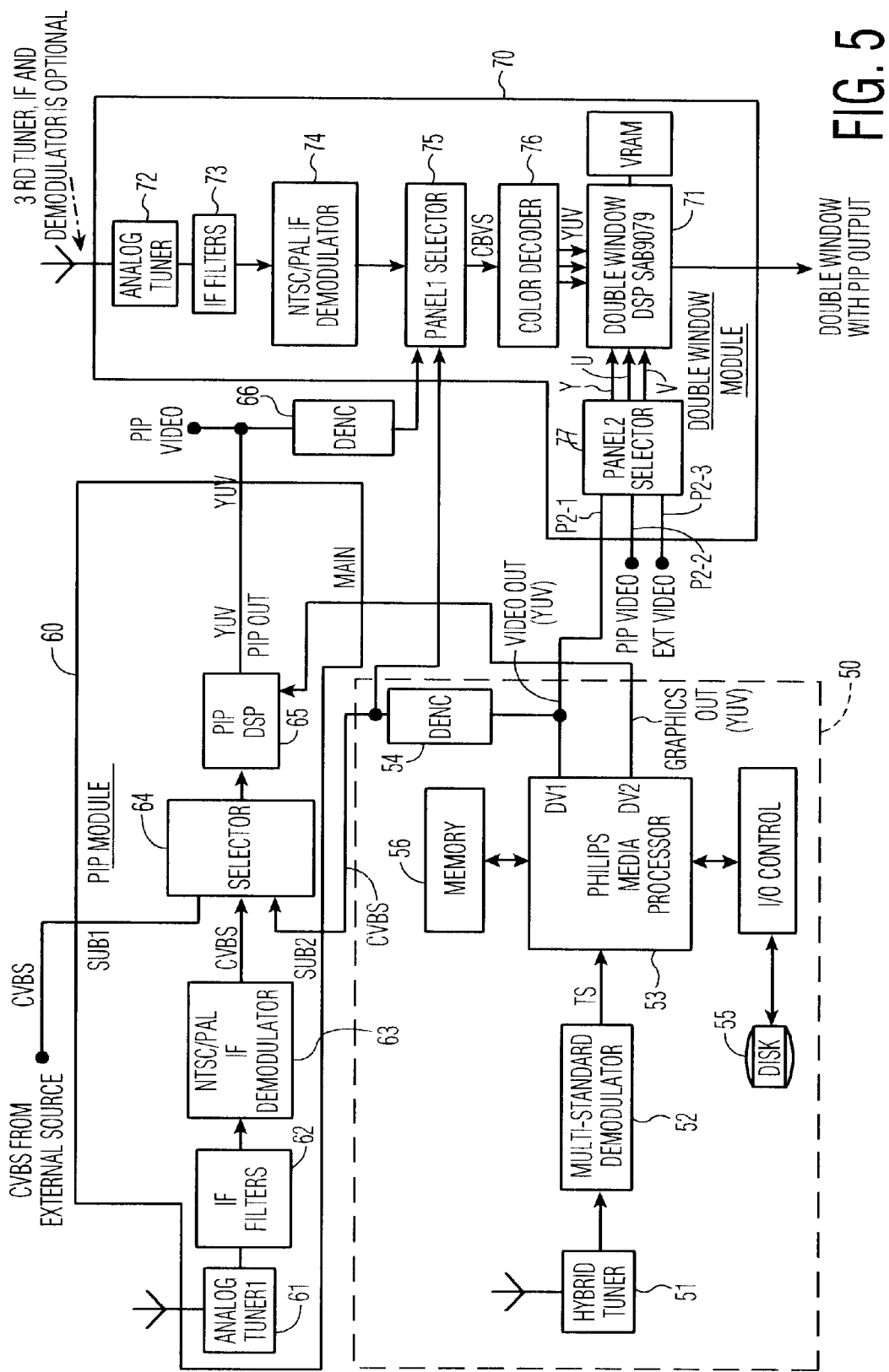
FIG. 5 shows a detailed description of a television in accordance with a preferred embodiment of the invention.

FIG. 5 shows a more detailed description of a preferred embodiment of the invention. It is comprised of a Digital Module 50, a PIP module 60 and a Double Window module 70. The digital module 50 can process video contained in ATSC terrestrial broadcast signals received via, the digital tuner 51 and combine it with other video or graphics sources for display. This embodiment supports video stored on an embedded mass storage device 55 (e.g. magnetic disk, DVD, Tivo-like data). It also supports the composition of displays with video stored in memory 56 (RAM) or video from external sources such as a VCR. Graphics, such as an EPG, generated by software in the media processor may also be one of the "video" sources of display information.

The digital tuner 51 receives digital terrestrial, cable or satellite broadcasts, performs IF filtering to reject adjacent channel interference and outputs an IF (1 MHz to 7 MHz or 41.25 MHz to 45.75 MHz) signal to the multi-standard demodulator 52. The multi-standard demodulator 52 is capable of decoding signals from ATSC, satellite, NTSC/PAL, or cable broadcasts. In the case of an ATSC broadcast, the demodulator 52 recovers the pilot carrier and synchronization information, demodulates the I-channel from the signal, and decodes it. The output of the demodulator 52 is an ATSC transport stream containing audio, video and other kinds of data. The Transport stream is processed by the media processor 53 to separate out and decode the video stream. Fully decompressed pictures are available at the DVI output of the media processor 53 in YUV format, which is directly applied to the input of the Double Window module 71 via a data selector (YUV MUX) 77. The DVI, YUV output of the media processor 53 is also converted to CVBS by the DENC (digital encoder) 54 and is used as one of the sources of input to the PIP module 60.

Graphics data composed of data received in the datastream is simultaneously available from DV2 port of the media processor 53. The DV2 output is a YUV video signal that carriers the program guide. It is applied to the MAIN input of the PIP module 60. The Philips Media Processor 53 also includes functionality which permits a user to scroll through the electronic program guide information appearing on DV2 and select the program information which appears on DV1.

PIP Module

The PIP module 60 accepts four sources of video input, one from an antenna, two CVBS signals, and one YUV signal on the MAIN input.

The antenna is connected to a tuner 61 that processes terrestrial broadcast channels in the UHF and VHF bands. The tuner 61 is controlled by the Philips Media Processor 53 to select any channel out of the RF spectrum. The output of the tuner 61 is filtered in the IF Filter block 62 to reject interference from picture and sound carriers in adjacent channels. The RF signal output by IF filter block 62 is then processed by the NTSC/PAL Demodulator 63 block to separate out the sound carrier and synchronization signals from the video of the tuned channel. The output of the NTSC/PAL demodulator 63 is a 6 MHz composite baseband video signal (CVBS) containing the color, brightness, and synchronization information of the picture in the selected channel. This video source can be selected via selector 64 as one of the inputs to the PIP DSP processor 65.

The SUB1 and SUB2 inputs of the PIP DSP processor 65 accepts CVBS signals from an external tuner (VCR, DVD player, etc.) or internal video sources and makes them available as possible selectable inputs to the PIP DSP processor 65. Video at the input to the PIP DSP 65 from demodulator 63 is scaled to $\frac{1}{16}$ or $\frac{1}{9}$ of its original size and multiplexed with the YUV signal from the Philips Media Processor 53. The MAIN input to the PIP processor 65 is connected to the DV2 output from the media processor 53, which is capable of providing a picture containing program guide information on this output.

The output of the PIP module contains a MAIN picture with a smaller sub-picture in one quadrant (typically). This combined output is converted to CVBS by the digital encoder 66 and used as one of the PANEL1 75 inputs to the Double Window Module 70. The YUV output of the PIP module is also available as one of the PANEL2 77 inputs of the Double Window module 70 to support panel-swap operations.

Double Window Module

The Double Window module accepts inputs from two major input groups. One group of inputs is intended for driving panel 1 of the dual screen display. The other group of inputs is intended for driving panel 2 of the double screen display. The PANEL1 selector 75 group of inputs are CVBS signals obtained from the PIP module 60 and the digital module 50. The third input in the PANEL1 selector 75 group is obtained from an analog tuner integrated into the Double Window module 70.

The signal received at the antenna of the Double Window module 70 is processed by the tuner 72 to select any channel out of the RF spectrum. The output of the tuner 72 is IF filtered 73 to remove interference from adjacent NTSC/PAL channels (sound and video carriers). The output of the IF filters 73 is processed by the IF sections internal to the NTSC/PAL demodulators 74 to remove the sound carrier and synchronization signals. The remaining picture information is demodulated and available as composite baseband (0–4.2 MHz) video at the output of the demodulator 74. The output of the demodulator 74 is fed into the PANEL1 video selector 75. One of the three CVBS video signals at the input to the PANEL1 selector 75 is chosen by the TV application (in this case, the CVBS signal containing the guide with PIP video) for output on panel 1 of the display. The output of the PANEL1 selector 75 is processed by the color decoder 76 to separate out the luminance component; remove the vertical and horizontal sync information; and demodulate the color information to its red and blue color difference signals. The separated luma and color difference signals are digitized and output in a YUV component format.

The PANEL2 selector 77 is controlled by the TV application to output one of the input YUV signals. The output of the PANEL2 selector 77 is used to drive panel 2 of the dual screen display.

The panel 1 and panel 2 YUV signals are combined in the Double Window DSP 71, which appropriately scales and multiplexes the two digital video signals to fit in the available display area of the screen.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A video system, comprising:
   a first video source receiver which receives a first video source including program information;
   a second video source receiver which receives a second video source including program information;
   an electronic program guide receiver which receives electronic program guide information;
   a processor which provides simultaneously to a display, 1) in a first half of the display, program information from the first video source; 2) in a second half of the display the electronic program guide; and 3) in a PIP portion of the second half of the display, program information from the second video source; and
   an on-screen selector which selects from the electronic program guide program information from the second video source which is to be displayed in the PIP.

2. The video system as claimed in claim 1 wherein the second video source provides information associated with the programs being browsed in the electronic program guide by the selector.

3. The video system as claimed in claim 1, wherein the first and second video sources are tuners.

4. The video system as claimed in claim 1 or 3, further including a memory for storing the electronic program guide.

5. A video system, comprising:
   a display;
   a first video source receiver which receives a first video source including program information;
   a second video source receiver which receives a second video source including program information;
   an electronic program guide receiver which receives electronic program guide information;
   a processor which provides simultaneously to a display, 1) in a first half of the display, program information from the first video source; 2) in a second half of the display the electronic program guide; and 3) in a PIP portion of the second half of the display, program information from the second video source; and
   an on-screen selector which selects from the electronic program guide program information from the second video source which is to be displayed in the PIP.

6. The video system as claimed in claim 5, wherein the first and second video sources are tuners.

7. The video system as claimed in claim 5 wherein the first video source is a tuner.

8. The video system as claimed in claim 5, wherein the second video source is a tuner.

9. A video system, comprising:
   a television module which processes video signals and provides a main picture signal;
   a PIP module which provides a composite picture which is a smaller subpicture within the main picture signal;
   a double window module which provides on a first half of a display a video signal and on a second half of the display the composite picture;
   wherein the television module includes an electronic program guide video source which provides an electronic program guide of program information as the main picture, and further includes a selector for scrolling through the electronic program guide and selecting the program information which is to be provided in the smaller subpicture.

10. The video system as claimed in claim 9, wherein the television module is a digital television module.

* * * * *